No. 838,271. PATENTED DEC. 11, 1906.
A. A. PETIT.
ATTACHMENT TO EYEGLASSES.
APPLICATION FILED SEPT. 1, 1906.

Witnesses.
F. S. Graham
John S. Walter

Inventor.
Albert A. Petit.
By Wm. H. Zimmerman.
Attorney.

UNITED STATES PATENT OFFICE.

ALBERT A. PETIT, OF CHICAGO, ILLINOIS.

ATTACHMENT TO EYEGLASSES.

No. 838,271.  Specification of Letters Patent.  Patented Dec. 11, 1906.

Application filed September 1, 1906. Serial No. 333,011.

*To all whom it may concern:*

Be it known that I, ALBERT A. PETIT, a citizen of France, and a resident of Chicago, Cook county, Illinois, have invented certain new and useful Improvements in Attachments to Eyeglasses, of which the following is a full and correct description, reference being had to the accompanying drawings, forming a part thereof, and in which—

Figure 1:
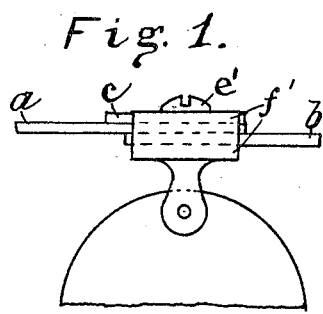
Figure 2:
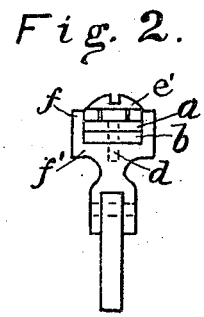
Figure 3:
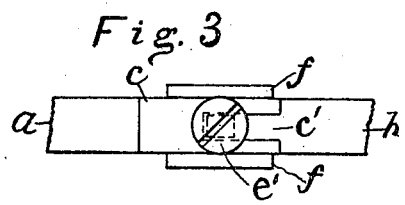
Figure 4:
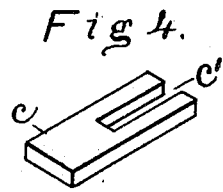
Figure 5:

Figure 1 shows the parts improved by my construction in side elevation. Fig. 2 shows the same in end view. Fig. 3 shows Fig. 1 in plan view. Fig. 4 shows the locking-piece in perspective, and Fig. 5 shows a specially-contrived screw in elevation.

Like reference-letters denote like parts throughout.

The object of my invention is to so construct the several parts which form the attachments to eyeglass-lenses that they may be fastened together readily by means of a screw in the usual manner and to provide said screw with a locking device which will prevent its turning, and thereby allowing the parts held by it to become loose.

It is a well-known fact that under present forms of construction the screws which hold the attachments to eyeglasses frequently become loose. To overcome said trouble, I construct my said improvement in substantially the following manner, namely:

In place of the ordinary screw I insert a screw $d$, provided with a square, hexagonal, or other form of polygonal head $e$, and surmount said head with a still larger round and slotted head $e'$. The shoulders of the lesser head hold the part or parts $a$ and $b$ to place. Thereafter I insert a forked locking-plate or lock $c$, provided with a slot $c'$, into which fit the flat sides of the head $e$, and thereby said screw is held from turning. The shoulders of the larger head $e'$ hold firmly on top of the lock $c$, which is driven into place after the screw $d$ is driven home, and the box sides $f$ of the box $f''$ hold the lock from turning.

The parts $a$ and $b$ are here shown as straight fragments. Neither is the relative position of said parts and the fragment of the eyeglass more than approximately correct, the invention not being affected by said parts.

One or any number of parts, like $a\ b$, may be held in the box $f''$, and the locking may be effected by one active side $f$ and one prong or leg of the lock.

What I claim is—

The combination with a box side and eyeglass part, of a screw with shouldered and flat-sided head, shouldered under a larger head, and a locking device between said larger head and eyeglass part and box side and lesser head.

ALBERT A. PETIT.

Witnesses:
WM. ZIMMERMAN,
HAYDEN H. BELL.